Dec. 17, 1957 P. J. JARVIS 2,816,510
GEAR PUMP
Filed Feb. 14, 1950

Inventor:-
Percival John Jarvis
By William E. P. Bayly
Attorney.

United States Patent Office 2,816,510
Patented Dec. 17, 1957

2,816,510

GEAR PUMP

Percival J. Jarvis, Barkingside, Ilford, England, assignor to The Plessey Company Limited, Ilford, England, a British company Application February 14, 1950, Serial No. 144,081

Claims priority, application Great Britain August 18, 1949

6 Claims. (Cl. 103—126)

This invention relates to high pressure gear wheel pumps embodying devices for maintaining axially adjustable end plates on bearing bushes in contact with the side faces of the gears by the application of hydraulic pressure.

United States Letters Patent No. 2,420,622 describes a gear wheel pump with pressure loaded bearing which consists of a housing with parallel overlapping cylindrical chambers having gears therein which mesh in the overlapping chambers, the gears are provided with oppositely extending journals which are located in bearing bushes within the housing, and pressure fluid is admitted between the face of the gears and bushings.

The pressure in the tooth spaces, due to the action of pumping, falls from the delivery pressure to the inlet pressure around the gears from the pressure to the inlet side; whereas the pressure applied to the rear of the end plates or bushings is uniform over the surface. The centre of pressure of the respective pressure loads on the inner faces adjacent to the gears and on the outer faces urging the plates or bushings inwards are forces opposite in direction but not on a common line of action. A tendency therefore exists for non-uniform rubbing pressure between the faces of the bushings or end plates and the gear faces.

An object of the invention is to reduce or eliminate this tendency for non-uniform rubbing, and to permit a reduction in the excess inward hydraulic load required to maintain the effective contact between the rubbing faces.

According to the present invention, the gear pump is characterised in that the chamber at one end of the bushings or end plates has an area adjacent to the suction side of the pump which is relieved of fluid pressure whereby the centre of pressure on the rear face of the bushings can be brought as nearly axially in line with that on the inner face as is desired.

Preferably, a reinforced sealing member is provided for relieving the pressure, for example, a flexible ring supported against the ambient pressure by a plate or skeleton frame to maintain the requisite shape.

This invention will now be described by way of examples with reference to the accompanying drawings, in which.

Referring to Figs. 1 to 4 inclusive.

Figure 1:
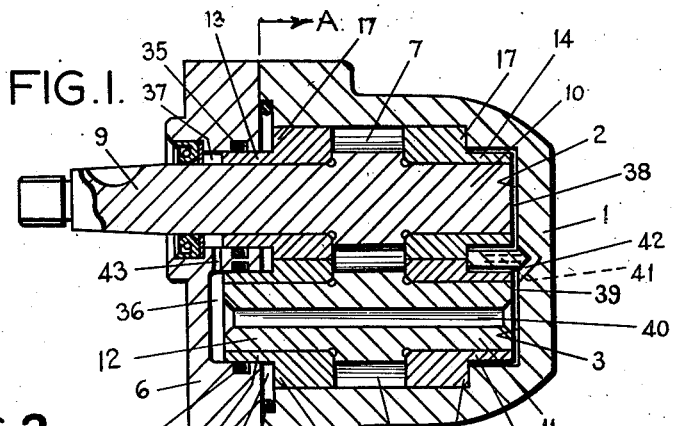
Fig. 1 is a cross section of a gear pump with an area at the rear end of one pair of the bearings separated from the pressure fluid.
Figures 2, 3:
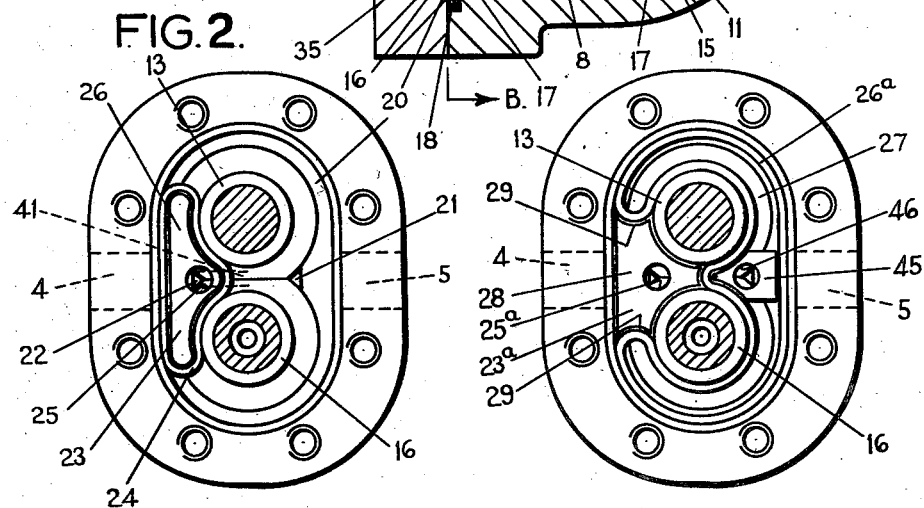
Fig. 2 is a section on line A—B of Fig. 1.
Figs. 3 and 4 show alternate constructions for separating an area at the rear end of the bearings from the pressure fluid.

Referring to Figs. 1 and 2, a pump casing 1 having one opened end is bored to provide a pumping chamber comprising intersecting bores 2, 3, said chamber having an inlet side and an outlet side each being respectively provided with inlet and outlet ports 4, 5 at the juncture of the bores 2, 3. A cover 6 is fitted to the end of casing 1 for closing the same.

Intermeshing gear impellers 7, 8 having axially extending journals 9, 10, 11, 12 are disposed in said pumping chamber and are provided with pairs of bearing bushings 13, 14 and 15, 16. The bushings have limited axial movement with respect to said journals and each is provided with an integral flange 17 having an inner face co-extensive with the inner end of each of said bushings to form end walls for said pumping chamber and to make endwise sealing contact with the sides of the impellers 7, 8. The outer faces of the flanges 17 at the covered end of the casing form, with a part of the face of the casing, a flat end wall therein, and formed between these outer faces and the cover 6 is a fluid pressure receiving chamber 20.

In accordance with the invention, means are provided for dividing the chamber 20 into a first zone adapted to receive low pressure fluid from the inlet side of the pump and into a second zone adapted to receive high pressure fluid from the outlet side of said pump. The first low pressure zone is smaller than the high pressure zone and is disposed in an area on the outer face of the flanges 17 corresponding to an area on the inner face of said flanges adjacent the inlet side of said pump.

The means for dividing the chamber 20 into the respective zones comprises a ring-like endless flexible annular sealing member of any suitable cross-sectional shape which marginally surrounds one of the zones and is adapted to be sealingly compressed between the cover 6 and the outer faces of the flanges 17 to isolate the fluid pressure received in one zone from the pressure received in the other.

In Fig. 2 the above referred to low pressure zone is indicated by the numeral 26 and this zone, which is located on the outer faces of the flanges on the side thereof adjacent the inlet side of said pump, is isolated from the high pressure zone, comprising the remainder of space 20, by means of a sealing member 24 which marginally surrounds the zone 26. Low fluid pressure at the pump inlet (which could conceivably be at zero pressure or even under slight vacuum) may be communicated with the zone 26 by a suitable conduit connecting said zone with the pump inlet side and this conduit may comprise a passage 22 formed by the removal of the axial sharp edges of intersection of the two bores on the inlet side of the pump. High pressure fluid may be admitted to the high pressure zone by a similar passage 21 formed on the outlet side of the pump.

In order to prevent the collapse of said sealing member 24 into the low pressure zone 26 when fluid pressure is admitted to the high pressure zone, a rigid perforate profiled member of less thickness than the depth of the chamber 20 and having a peripheral configuration conforming to the peripheral shape of the low pressure zone is disposed in said zone in edgewise engagement with the aforementioned sealing member at the boundaries between the high and low pressure zones. In Fig. 2 the rigid perforate member is shown as a flat plate 23 having a port 25 therein, the plate being peripherally engaged at its edges by the annular sealing member 24. Thus the low pressure zone 26 is isolated from the high pressure zone so that upon pump operation outlet fluid pressure is exerted on the outer faces of the flanges 17 of bushings 13 and 16 in the high pressure zone only to move the bushings axially inwardly and the inner faces of the flanges 17 into sealing contact with the sides of the gear impellers, the low pressure zone 26 providing a relieved area whereby the center of pressure on the outer faces of the bushings can be brought as nearly axially in line with that on the inner face as is desired.

The opening 25 in the plate 23 and the passage 22 communicating the low pressure zone 26 with low pressure or inlet side of the pump serve to by-pass to said inlet side any fluid that may leak through or past said sealing member from the high-pressure zone, thus preventing pressure buildup in the relieved area 26.

In order to prevent accumulation of pressure in the spaces 36, 37, 38, 39 between the ends of the bushes and the housing 1 on one hand, and the cover 6 on the other, the space 37 is connected by means of a passage 43 to the space 36 which in turn is connected to the space 39 via the longitudinal passage 40 in the gear 8 and the space 39 is connected to the space 38 by means of a passage 42 which is connected to the lower extension of passage 22 by means of a passage 41 so permitting flow of fluid from any or all of the spaces 36, 37, 38, 39 to the inlet side of the pump via the passage 41.

In Fig. 1 there is shown a sealing ring 35 for each bushing which serves to prevent leakage of pressure fluid from the chamber 20.

Figure 4:
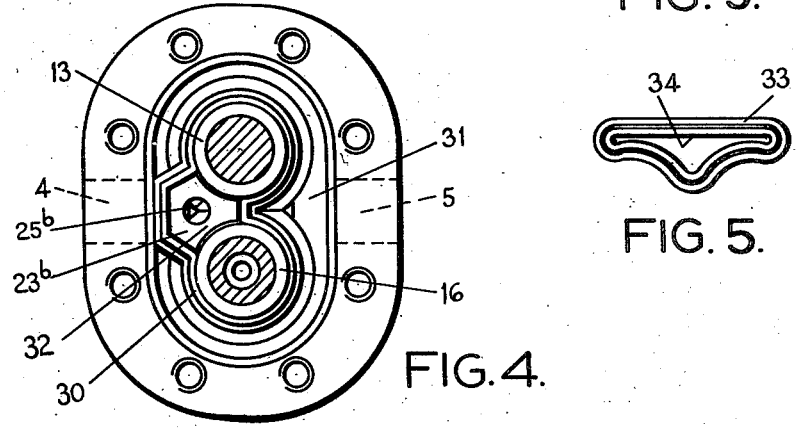

Referring to Figs. 3 and 4 the arrangement and construction of the pump is substantially the same as hereinbefore described with reference to Fig. 1 with the exception of the means of limiting the area of the pressure in the space 20 and there is no sealing member 35 (Fig. 1) because the pressure fluid in chamber 20 is fully sealed by the flexible sealing members 30 (Fig. 4) and 26ª (Fig. 3).

In Fig. 3 a convolute flexible sealing member 26 forms the demarcation boundary zone for a zone 27 which is open to the pressure side, and a shallow plate 23ª is located outside this zone and forms another zone 28 which communicates by way of the aperture 25ª in said plate 23ª with the low pressure side.

The plate 23ª has a configuration which corresponds with a part of the bushings 13, 16 and housing 1 and the opposite ends and intermediate portion between the bushings 13, 16 are concaved, denoted generally by numeral 29 which, with the aid of a guide plate 45 fixed to casing 1 enables the sealing member 26 to maintain its shape through the intersection portions thereof in contact with the plate 23ª, and guide plate 45 when the pressure fluid is admitted into zone 27. The plate 45 has an aperture 46 to allow the passage of pressure fluid.

Referring to Fig. 4, the flexible ring 30 surrounds both the bearing bushings 13 and 16 and a plate 23ᵇ which is shaped as indicated having the aperture 25ᵇ to provide a leakage path for the purpose herein set forth with reference to Figs. 1 to 4. The sealing member 30 is maintained in contact with the bushings 13, 16 and edges of the plate 23ᵇ by the pressure of fluid in the zone 31 from the pressure side and the space occupied by the plate 23ᵇ forms the other zone 32.

Figure 5:
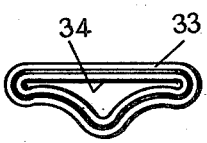
Fig. 5 is a further modified form of sealing member.

In Fig. 5 the sealing member applied to the suction side of the chamber as hereinbefore described consists of a flexible sealing member 33 which is located over a metal frame 34 which is profiled to the shape shown in Fig. 5 or to any other desired contour.

I claim:

1. A gear pump comprising a casing having one opened end and a pumping chamber therein having an inlet side and an outlet side, a cover for closing said opened end, intermeshing gear impellers in said pumping chamber having axially extending journals, pairs of bearing bushings in said casing for supporting said journals, said bushings being axially movable with respect to said journals, flanges integral with said bushings and having inner faces co-extensive with the inner ends of said bushings and adapted to form end walls for said pumping chamber and to make endwise sealing contact with the sides of said impellers, one of each pair of said flanges having outer faces at the covered end of said casing to form an end wall therein, a chamber formed between said cover and said outer faces, means for dividing said chamber into a first zone adapted to receive low pressure fluid from the inlet side of said pump and into a second zone adapted to receive high pressure fluid from the outlet side of said pump, said first low pressure zone being smaller than said second high pressure zone and being disposed in an area on said outer faces of said flanges corresponding to an area on said inner faces of said flanges adjacent the inlet side of said pump, said dividing means comprising an endless flexible annular sealing member adapted to be sealingly compressed between said cover and said outer faces of said flanges and marginally surround one of said zones to isolate it from the other thereof, a first fluid passage connecting the low pressure zone to the inlet side of said pump and a second fluid passage connecting the high pressure zone to the outlet side of said pump, and a rigid perforate profiled member of less thickness than the depth of said chamber and having a peripheral configuration substantially conforming to the peripheral shape of said low pressure zone at the boundaries between said high and low pressure zones and being in edgewise engagement with said sealing member at said boundaries to prevent the collapse of said sealing member into said low pressure zone when fluid pressure is admitted to said high pressure zone during pumping.

2. The gear pump in accordance with claim 1 wherein said rigid perforate member comprises a continuous profiled frame.

3. A gear pump comprising a casing having one opened end and a pumping chamber therein having an inlet side and an outlet side, a cover for closing said opened end, intermeshing gear impellers in said pumping chamber having axially extending journals, pairs of bearing bushings in said casing for supporting said journals, said bushings being axially movable with respect to said journals, flanges integral with said bushings and having inner faces co-extensive with the inner ends of said bushings and adapted to form end walls for said pumping chamber and to make endwise sealing contact with the sides of said impellers, one of each pair of said flanges having outer faces at the covered end of said casing to form an end wall therein, a chamber formed between said cover and said outer faces, means for dividing said chamber into a first zone adapted to receive low pressure fluid from the inlet side of said pump and into a second zone adapted to receive high pressure fluid from the outlet side of said pump, said first low pressure zone being smaller than said second high pressure zone and being disposed in an area on said outer faces of said flanges corresponding to an area on said inner faces of said flanges adjacent the inlet side of said pump, said dividing means comprising an endless flexible annular sealing member adapted to be sealingly compressed between said cover and said outer faces of said flanges and marginally surround one of said zones to isolate it from the other thereof, a first fluid passage connecting the low pressure zone to the inlet side of said pump and a second fluid passage connecting the high pressure zone to the outlet side of said pump, and a rigid perforate profiled member of less thickness than the depth of said chamber and having a peripheral configuration substantially conforming to the peripheral shape of said low pressure zone at the boundaries between said high and low pressure zones and being in edgewise engagement with said sealing member at said boundaries to prevent the collapse of said sealing member into said low pressure zone when fluid pressure is admitted to said high pressure zone during pumping, said sealing member marginally surrounding said low pressure zone and peripherally engaging the edges of said rigid perforate profiled member.

4. A gear pump comprising a casing having one opened end and a pumping chamber therein having an inlet side and an outlet side, a cover for closing said opened end, intermeshing gear impellers in said pumping chamber having axially extending journals, pairs of bearing bushings in said casing for supporting said journals, said bushings being axially movable with respect to said journals, flanges integral with said bushings and having inner faces co-extensive with the inner ends of said bushings and adapted to form end walls for said pumping chamber and to make endwise sealing contact with the sides of said impellers, one of each pair of said flanges having outer faces at the covered end of said casing to form an end wall therein, a chamber formed between said cover and said outer faces, means for dividing said chamber into a first zone adapted to receive low pressure fluid from the inlet side of said pump and into a second zone adapted to receive high pressure fluid from the outlet side of said pump, said first low pressure zone being smaller than said second high pressure zone and being disposed in an area on said outer faces of said flanges corresponding to an area on said inner faces of said flanges adjacent the inlet side of said pump, said dividing means comprising an endless flexible annular sealing member adapted to be sealingly compressed between said cover and said outer faces of said flanges and marginally surround one of said zones to isolate it from the other thereof, a first fluid passage connecting the low pressure zone to the inlet side of said pump and a second fluid passage connecting the high pressure zone to the outlet side of said pump, and a rigid perforate profiled member of less thickness than the depth of said chamber and having a peripheral configuration substantially conforming to the peripheral shape of said low pressure zone at the boundaries between said high and low pressure zones and being in edgewise engagement with said sealing member at said boundaries to prevent the collapse of said sealing member into said low pressure zone when fluid pressure is admitted to said high pressure zone during pumping, said sealing member marginally surrounding said high pressure zone.

5. The gear pump in accordance with claim 4 including in addition a second rigid perforate member disposed in said high pressure zone adjacent the outlet side of said pump and engaging said sealing member to retain the shape of said member in a configuration corresponding to said high pressure zone.

6. A gear pump comprising a casing having one opened end and a pumping chamber therein having an inlet side and an outlet side, a cover for closing said opened end, intermeshing gear impellers in said pumping chamber having axially extending journals, pairs of bearing bushings in said casing for supporting said journals, said bushings being axially movable with respect to said journals, flanges integral with said bushings and having inner faces co-extensive with the inner ends of said bushings and adapted to form end walls for said pumping chamber and to make endwise sealing contact with the sides of said impellers, one of each pair of said flanges having outer faces at the covered end of said casing to form an end wall therein, a chamber formed between said cover and said outer faces, means for dividing said chamber into a first zone adapted to receive low pressure fluid from the inlet side of said pump and into a second zone adapted to receive high pressure fluid from the outlet side of said pump, said first low pressure zone being smaller than said second high pressure zone and being disposed in an area on said outer faces of said flanges corresponding to an area on said inner faces of said flanges adjacent the inlet side of said pump, said dividing means comprising an endless flexible annular sealing member adapted to be sealingly compressed between said cover and said outer faces of said flanges and marginally surround one of said zones to isolate it from the other thereof, a first fluid passage connecting the low pressure zone to the inlet side of said pump and a second fluid passage connecting the high pressure zone to the outlet side of said pump, and a rigid perforate profiled member of less thickness than the depth of said chamber and having a peripheral configuration substantially conforming to the peripheral shape of said low pressure zone at the boundaries between said high and low pressure zones and being in edgewise engagement with said sealing member at said boundaries to prevent the collapse of said sealing member into said low pressure zone when fluid pressure is admitted to said high pressure zone during pumping, said rigid perforate member comprising a ported plate.

References Cited in the file of this patent

UNITED STATES PATENTS

| | | |
|---|---|---|
| 1,620,261 | Kennedy | Mar. 8, 1927 |
| 1,719,025 | Scheminger | July 2, 1929 |
| 1,780,109 | Berglund | Oct. 28, 1930 |
| 1,795,579 | Storey | Mar. 10, 1931 |
| 1,972,632 | Patton | Sept. 4, 1934 |
| 2,044,873 | Beust | June 23, 1936 |
| 2,147,777 | Oshei | Feb. 21, 1939 |
| 2,405,061 | Shaw | July 30, 1946 |
| 2,444,165 | Lauck | June 29, 1948 |
| 2,472,031 | Wichorek | May 31, 1949 |
| 2,487,732 | Schanzlin | Nov. 8, 1949 |
| 2,527,941 | Lauck et al. | Oct. 31, 1950 |